US012735571B2

(12) United States Patent
Ahearn et al.

(10) Patent No.: US 12,735,571 B2
(45) Date of Patent: Sep. 15, 2026

(54) SILICONE FORMULATION WITH HIGH TEMPERATURE STABILITY AND CLARITY

(71) Applicant: Henkel AG & Co. KGaA, Duesseldorf (DE)

(72) Inventors: Matthew Ahearn, Union, NJ (US); Tianzhi Zhang, Skillman, NJ (US); Christina Despotopoulou, Minneapolis, MN (US); Sebastien Lanau, Duesseldorf (DE); Johann Klein, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 1025 days.

(21) Appl. No.: 17/807,924

(22) Filed: Jun. 21, 2022

(65) Prior Publication Data

US 2022/0411634 A1 Dec. 29, 2022

Related U.S. Application Data

(60) Provisional application No. 63/214,360, filed on Jun. 24, 2021.

(51) Int. Cl.
*C08L 83/04* (2006.01)

(52) U.S. Cl.
CPC ......... *C08L 83/04* (2013.01); *C08L 2205/025* (2013.01); *C08L 2205/035* (2013.01)

(58) Field of Classification Search
CPC ............... C08L 83/04; C08L 2205/025; C08L 2205/035; C08L 83/08; C08L 83/12; C08G 77/045; C08G 77/20
See application file for complete search history.

(56) References Cited

U.S. PATENT DOCUMENTS 3,268,561 A 8/1966 Peppel et al.
4,416,921 A 11/1983 Dunn
4,618,703 A 10/1986 Thanawalla et al.
4,675,346 A 6/1987 Lin et al.
5,236,637 A 8/1993 Hull
6,413,697 B1 7/2002 Melisaris et al.
6,540,045 B1 4/2003 Widmer et al.
7,195,472 B2 3/2007 John
7,850,870 B2 * 12/2010 Ahn ........................ H01B 1/20 526/197
9,073,836 B2 7/2015 Klumpe et al.
9,598,606 B2 3/2017 Rolland et al.
2006/0014915 A1 * 1/2006 Ahn .................... C09D 183/08 528/15
2007/0116311 A1 5/2007 Litke et al.
2017/0173873 A1 6/2017 Huang et al.
2020/0071525 A1 3/2020 Folch et al.
2021/0332175 A1 10/2021 Matsumoto et al.

FOREIGN PATENT DOCUMENTS

KR 20110104663 A * 9/2011 ........... C09D 183/10
WO WO-2014036462 A1 * 3/2014 ........... C09D 133/08
WO 2019055645 A1 3/2019
WO 2020059650 A1 3/2020

OTHER PUBLICATIONS

"Aerosil 130 Product Information," 2018, Evonik Operations GmbH, pp. 1-2 (Year: 2018).*
Lebedev, B.V et al. Thermodynamics of Poly(dimethyldisiloxane) in the Range of 0-350 K. Vysokomol. Soed. Ser. A (1978), 20, pp. 1297-1303.
Duda, A. et al. Thermodynamics and Kinetics of Ring-Opening Polymerization in Handbook of Ring-Opening Polymerization, Wiley-VCH, Weinheim, Germany, (2009) p. 8.
Ackermann, J. et al. Chemie und Technologie der Silikone II. Herstellung und Verwendung von Siliconpolymeren, Chemie in unserer Zeit (1989), 23, pp. 86-99.
Chojnowski, J. et al. Cationic Polymerization of Siloxanes Die Macromolekulare Chemie 175, pp. 3299-3303 (1974).
Chojnowski, J. et al. Kinetically controlled ring-opening polymerization, J. Inorg. Organomet. Polym. (1991) 1, pp. 299-323.
Nuyken et al. Ring-Opening Polymerization—An Introductory Review Polymers 2013, 5, 361-403.
J. Am. Chem. Soc. 71 (1949) 1152.
Cochrane H et al., Influence of fumed silica properties on the processing, curing, and reinforcement properties of silicone rubber, Rubber Chemistry and Technology, vol. 66, No. 1, Mar. 1993, pp. 48-60.

* cited by examiner

*Primary Examiner* — Robert S Jones, Jr.
*Assistant Examiner* — Joshua Caleb Bledsoe
(74) *Attorney, Agent, or Firm* — Mary K. Cameron

(57) ABSTRACT

The present disclosure is directed to a radiation curable composition comprising a (meth)acrylate functionalized polysiloxane polymer. In some embodiments the composition further comprises one or more of a crosslinker, fumed silica, a functionalized silsesquioxane, and/or an acrylate monomer. The composition can be used as a component of an adhesive, sealant or coating. In some embodiments the composition can be used as a curable resin for additive manufacturing. The compositions are low viscosity liquids at room temperature and resist compression set.

11 Claims, No Drawings

SILICONE FORMULATION WITH HIGH TEMPERATURE STABILITY AND CLARITY

FIELD

The present disclosure is directed to a low viscosity liquid silicone composition. The composition can be cured to a thermoset solid form by exposure to actinic radiation and/or heat. The cured reaction products retain clarity and structural integrity at high temperatures.

BACKGROUND

Adhesives are used in many industries to bond various substrates and assemblies together. Radiation curable adhesives can form crosslinks (cure) upon sufficient exposure to radiation such as electron beam radiation or actinic radiation such as ultraviolet (UV) radiation, visible light or infrared radiation. UV radiation is in the range of 100 to 400 nanometers (nm). Visible light is in the range of 400 to 780 nanometers (nm). Infrared radiation is in the range of 780 to 1,000 nanometers (nm).

Radiation curable polysiloxanes are desirable as they can be used to formulate radiation curable adhesives and sealants. Further, the polysiloxane backbone provides desirable flexibility and temperature resistance to the cured material.

Compression set refers to the ability of a cured elastomeric material to maintain elastic properties after prolonged compressive stress. Compression set testing measures the somewhat permanent deformation of the cured elastomeric material specimen after it has been exposed to compressive stress under defined conditions for a defined time period. Elastomers with good compression set properties provide strong performance in gasketing and sealing applications.

Viscosity is the resistance of a material to flow. Uncured elastomeric materials with lower viscosity are easier to apply and when molded and cured can provide finely detailed molded parts. Uncured elastomeric materials with higher viscosity are harder to apply and mold. At some point the elastomeric material viscosity can be too high for use in some applications. Briefly, cured products with better compression set will return closer to their precompression dimensions. Cured reaction products of uncured elastomeric materials with lower viscosity will have larger compression set values that are not desirable for many applications. Cured reaction products of uncured elastomeric materials with higher viscosity will have more desirable compression set properties but the uncured materials will be difficult or impossible to use.

Some applications such as additive manufacturing require the uncured material be a liquid with a desired viscosity of 10,000 cps or less at room temperature.

There is a need for elastomeric materials having a lower uncured viscosity for ease of use that also have desirable compression set properties when cured.

SUMMARY

One aspect of the present disclosure provides radiation and/or heat curable polysiloxane compositions that are low viscosity liquids at room temperature.

One aspect of the present disclosure provides radiation and/or heat curable polysiloxane compositions that maintain acceptable mechanical properties and optical clarity after exposure to 200° C. for 100 hours.

One aspect of the present disclosure provides radiation and/or heat curable polysiloxane compositions that can be used in additive manufacturing and/or three-dimensional printing.

One aspect of the present disclosure provides radiation and/or heat curable polysiloxane compositions that are essentially free of hydrosilation crosslinkers comprising Si—H and/or S—H groups.

aspect of the present disclosure provides radiation and/or heat curable polysiloxane compositions wherein cured reaction products have a compression set of 60% or less, preferably 50% or 40% or 30% or less and more preferably 20% or 10%.

One aspect of the present disclosure provides a method of additive manufacturing using the disclosed radiation and/or heat curable polysiloxane compositions.

DETAILED DESCRIPTION

The singular forms "a", "an" and "the" include plural referents unless the context clearly dictates otherwise.

About or "approximately" as used herein in connection with a numerical value refer to the numerical value±10%, preferably ±5% and more preferably ±1% or less.

At least one, as used herein, means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Preferred and preferably are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

The molecular weights given in the present text refer to number average molecular weights (Mn), unless otherwise stipulated. Molecular weight data can be obtained by gel permeation chromatography (GPC) calibrated against polystyrene standards in accordance with DIN 55672-1:2007-08 at 35° C., unless otherwise stipulated. The weight average molecular weight Mw can be determined by GPC, as described for Mn. "Polydispersity index" refers to a measure of the distribution of molecular mass in a given polymer sample. The polydispersity index is calculated by dividing the weight average molecular weight (Mw) by the number average molecular weight (Mn).

For convenience in the description of the process, unsaturation provided by $CH_2$—CH—$CH_2$—terminal group is referred to as "allyl" unsaturation.

Aliphatic refers to a nonaromatic hydrocarbon compound in which the constituent carbon atoms can be straight-chain, branched chain or cyclic, as in alicyclic compounds; saturated as in the paraffins; or unsaturated as in the olefins and alkynes.

Alkyl refers to a monovalent group that contains carbon atoms and hydrogen atoms, for example 1 to 8 carbons atoms, that is a radical of an alkane and includes linear and branched configurations. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may optionally be substituted. Preferred substituents include one or more groups selected from halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. Preferred alkyl groups include unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl).

Alkylene refers to a divalent group that contains carbon atoms, for example from 1 to 20 carbon atoms, that is a radical of an alkane and includes linear and branched organic groups, which may be unsubstituted or optionally substituted. Preferred alkylene groups include unsubstituted alkylene groups containing from 1-12 carbon atoms ($C_1$-$C_{12}$ alkylene)—for example unsubstituted alkylene groups containing from 1 to 6 carbon atoms ($C_1$-$C_6$ alkylene) or from 1 to 4 carbons atoms ($C_1$-$C_4$ alkylene).

Alkenyl group refers to an aliphatic carbon group that contains carbon atoms, for example 2 to 8 carbon atoms and at least one double bond. Like the aforementioned alkyl group, an alkenyl group can be straight or branched, and may be unsubstituted or may be optionally substituted. Examples of $C_2$-$C_5$ alkenyl groups include, but are not limited to: allyl; isoprenyl; 2-butenyl; and, 2-hexenyl.

Aryl or aromatic group used alone or as part of a larger moiety—as in "aralkyl group"-refers to unsubstituted or optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include phenyl; indenyl; naphthalenyl, tetrahydronaphthyl, tetrahydroindenyl; tetrahydroanthracenyl; and, anthracenyl.

Arylene is a bivalent aryl group and may be unsubstituted or optionally substituted.

Aralkyl refers to an alkyl group that is substituted with an aryl group. An example of an aralkyl group is benzyl.

Acrylate refers to the univalent-O—C(O)—C═C moiety. Methacrylate refers to the univalent-O—C(O)—$C(CH_3)$═C moiety. (Meth)acrylate refers to acrylate and methacrylate.

Acryloyl (ACR) refers to a —C(O)—C═C moiety. Methacryloyl (MCR) refers to a —C(O)—$C(CH_3)$—C moiety. (Meth)acryloyl refers to acryloyl and methacryloyl.

Anhydrous means that the applicable mixture or component comprises less than 0.1 wt. % of water, based on the weight of the mixture or component.

Catalytic amount means a sub-stoichiometric amount of catalyst relative to a reactant.

Cycloalkyl refers to a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

Heteroatom is an atom other than carbon or hydrogen, for example nitrogen, oxygen, phosphorus or sulfur. The expression "interrupted by at least one heteroatom" means that the main chain of a residue comprises, as a chain member, at least one heteroatom.

Heteroalkyl refers to a monovalent alkyl group that contains carbon atoms interrupted by at least one heteroatom and includes linear and branched configurations. Heteroalkyl groups may be unsubstituted or may be optionally substituted. Preferred substituents include one or more groups selected from halo, nitro, cyano, amido, amino, oxygen, sulfonyl, sulfinyl, sulfanyl, sulfoxy, urea, thiourea, sulfamoyl, sulfamide and hydroxy.

Heteroalkylene refers to a divalent alkylene group that contains carbon atoms interrupted by at least one heteroatom and includes linear and branched configurations, which may be unsubstituted or optionally substituted.

Hydrocarbyl refers to a moiety comprising C and H atoms. Heterocarbyl refers to a moiety comprising C and H atoms as well as heteroatoms.

Isocyanate means a compound which comprises only one isocyanate (—NCO) group. The isocyanate compound does not have to be a polymer, and can be a low molecular weight compound.

Ether refers to a compound having an oxygen atom connected to two alkyl or aryl groups.

Oligomer means a defined, small number of repeating monomer units such as 5-25,000 units, and desirably 10-100 units which have been polymerized to form a molecule, and is a subset of the term polymer. Polymer means any polymerized product greater in chain length and molecular weight than the oligomer, i.e. or degrees of polymerization greater than 25,000.

Polyether refers to a compound having more than one ether group. Exemplary polyethers include polyoxymethylene, polyethylene oxide and polypropylene oxide.

Polyisocyanate means a compound which comprises two or more isocyanate (—NCO) groups. The polyisocyanate compound does not have to be a polymer, and can be a low molecular weight compound.

Polymerization conditions means the reaction conditions suitable to combine monomers into polymers. In one embodiment the polymerization conditions include those conditions necessary for ring-opened cyclic siloxanes to combine with one another to form a silicone polymer within a polymer matrix.

POSS refers to the family of polyhedral oligomeric silsesquioxane molecules. The polyhedral oligomeric silsesquioxane molecules can be functionalized with reactive moieties such as (meth)acrylate.

Ring-opening polymerization denotes a polymerization in which a cyclic compound (monomer) is opened to form a linear polymer. Ring-opening polymerization with respect to siloxane chemistry specifically relates to a polymerization reaction using cyclosiloxane monomers, in which reaction the ring of the cyclosiloxane monomer is opened in the presence of an appropriate catalyst. The reaction system tends towards an equilibrium between the desired resulting high-molecular compounds, a mixture of cyclic compounds and/or linear oligomers, the attainment of which equilibrium largely depends on the nature and amount of siloxane(s), the catalyst used and on the reaction temperature. The use of solvents and/or emulsions in the polymerization is not recommended and should be avoided as their removal once the reaction is complete can be complex. Various mechanisms of anionic and cationic ring opening polymerization of cyclic siloxane monomers which might find utility in the present invention are disclosed inter alia in: i) Lebedev, B. V et al. *Thermodynamics of Poly(dimethyldisiloxane) in the Range of* 0-350 K. Vysokomol. Soed. Ser. A (1978), 20, pages 1297-1303; ii) Duda, A. et al. *Thermodynamics and Kinetics of Ring-Opening Polymerization in Handbook of Ring-Opening Polymerization*, Wiley-VCH, Weinheim, Germany, (2009) page 8; iii) Ackermann, J. et al. *Chemie und Technologie der Silikone II. Herstellung und Verwendung von Siliconpolymeren*, Chemie in unserer Zeit (1989), 23, pages 86-99; and, iv)Chojnowski, J. et al. *Cationic Polymerization of Siloxanes* Die Macromolekulare Chemie 175, pp. 3299-3303 (1974); v)Choijnowski, J. et al. *Kinetically controlled ring-opening polymerization*, J. Inorg. Organomet. Polym. (1991) 1, pages 299-323; and, vi) Nuyken et al. *Ring-Opening Polymerization-An Introductory Review* Polymers 2013, 5, 361-403.

Room temperature refers a temperature of about 20° C. to 25° C.

A secondary alcohol group or a secondary hydroxyl group is constituted by a hydroxy group (—OH) attached to a saturated carbon atom which has two other carbon atoms attached to it. Analogously, a "tertiary alcohol group" or "tertiary hydroxyl group" is constituted by a hydroxy group (—OH) attached to a saturated carbon atom which has three other carbon atoms attached to it.

Substituted refers to the replacement of an atom in any possible position on a molecule by one or more substituent groups. Useful substituent groups are those groups that do not significantly diminish the disclosed reactions. Exemplary substituents include, for example, alkyl, alkenyl, alkynyl, cycloalkyl, cycloalkenyl, cycloalkynyl, aryl, aralkyl, heteroaryl, heteroalicyclyl, heteroaralkyl, heteroalkenyl, heteroalkynyl, (heteroalicyclyl)alkyl, aryloxy, acyl, ester, mercapto, alkylthio, arylthio, carbonyl, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, silyl, sulfenyl, sulfinyl, sulfonyl, haloalkoxy, trihalomethanesulfonyl, trihalomethanesulfonamido, amino including mono- and di-substituted amino groups and the protected derivatives thereof, carbamate, halogen, (meth)acrylate, epoxy, oxetane, urea, urethane, $N_3$, NCS, CN, $NO_2$, $NX^1X^2$, $OX^1$, $C(X^1)_3$, $COOX^1$, $SX^1$, $Si(OX^1);X_{3-i}{}^2$, alkyl, alkoxy; wherein each $X^1$ and each $X^2$ independently comprise H, alkyl, alkenyl, alkynyl, aryl or halogen and i is an integer from 0 to 3.

In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure. One aspect of the present disclosure provides UV and/or heat curable compositions. The curable compositions comprise a (meth)acrylate-functionalized polysiloxane polymer; a di(meth)acrylate polydimethyl siloxane (PDMS) oligomer; a mono(meth)acrylate polydimethyl siloxane (PDMS) oligomer; a specific range of surface treated hydrophilic fumed silica additives; a reaction initiator; and optionally one or more additives.

(Meth)Acrylate Functionalized Polysiloxane Polymer

In preferred embodiments the radiation curable (meth) acrylate terminated polysiloxane polymer has structure I

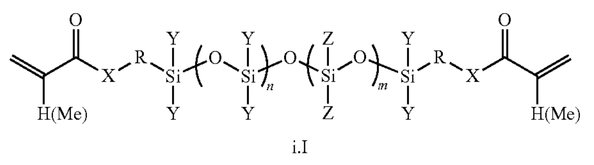

i.I

Each X is independently selected from O or N.

Each R is a bivalent moiety independently selected from alkylene, heteroalkylene, arylene, heteroarylene, aralkylene, amine; urethane; urea; ether, ester and combinations thereof. In some embodiments R can be $C_1$-6 alkylene,-alkylene-urethane-ether-,-amine-alkylene-and alkylene-urea-alkylene-.

Each Y is independently selected from H, alkyl and aryl.

Each Z is independently selected from H, alkyl and aryl. In some embodiments each Si atom in the m block has one phenyl Z moiety and one $C_1$-3 alkyl Z moiety.

n is an integer from about 1 to about 2300.

m is an integer from 0 to about 2300. If m is greater than 1, then the n blocks and the m blocks can be arranged in any order. Thus, structure I can have a block copolymer structure comprising a n-n-n-m-m-m blocks or an alternate copolymer structure comprising a n-m-n-m-n-m block structure or a random copolymer structure comprising randomly arranged n and m blocks.

In some embodiments n+m is 200 or greater, preferably 100 or greater and more preferably 1200 or greater. In some embodiments where each Y is alkyl, each R is alkylene, each X is O and the O atom is bonded to a primary carbon atom, then n+m is 1000 or greater, preferably 1100 or greater; more preferably 1200 or greater.

The radiation curable (meth)acrylate terminated polysiloxane polymer can be prepared by a number of reactions. In one embodiment a radiation curable, (meth)acrylate terminated polysiloxane polymer is the reaction product of a dicarbinol silicone polymer and a (meth)acrylate terminated isocyanate. In another embodiment a radiation curable, (meth)acrylate terminated polysiloxane polymer is the reaction product of one or more cyclic siloxanes and a di(meth) acrylate terminated siloxane oligomer. In another embodiment a radiation curable, (meth)acrylate terminated polysiloxane polymer is the reaction product of an amine terminated siloxane and a (meth)acrylate terminated isocyanate. In another embodiment a radiation curable, (meth) acrylate terminated polysiloxane polymer is the reaction product of an amine terminated siloxane and an acrylic acid chloride. In one embodiment a radiation curable, (meth) acrylate terminated polysiloxane polymer is the reaction product of a dicarbinol silicone polymer and an acrylic acid chloride.

Preparation of a radiation curable, (meth)acrylate terminated polysiloxane polymer by reaction of a dicarbinol silicone polymer and a (meth)acrylate terminated isocyanate.

Preparation of Dicarbinol Silicone Polymer-Step i

The dicarbinol silicone polymer can be prepared by in a first step reacting a hydroxyalkyl allyl ether having a secondary or tertiary alcohol group with a siloxane to form a reaction product and in a second step reacting that reaction product with at least one cyclic siloxane.

Hydroxyalkyl-Allyl Ethers

Some useful hydroxyalkyl-allyl ethers possess allyl unsaturation and a secondary or tertiary hydroxyl group and conform to the following general Formula (I)

(I)

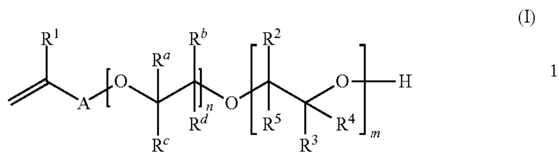

wherein n is 0, 1, 2, 3, 4 or 5, preferably 0; m is 1, 2, 3, 4 or 5, preferably 1; A denotes a spacer group which is constituted by a covalent bond or a $C_1$-$C_{20}$ alkylene group; $R^1$ is selected from hydrogen, a $C_1$-$C_8$alkyl group, a $C_3$-$C_{10}$ cycloalkyl group, a $C_6$-$C_{18}$ aryl group or a $C_6$-$C_{18}$ aralkyl group; $R^a$, $R^b$, $R^c$, $R^d$, $R^2$, $R^3$, $R^4$ and $R^5$ may be the same or different and each is independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen.

Compounds conforming to Formula (I) are most suitably derived as alkylene oxide adducts of primary or secondary alcohols having ally unsaturation.

Said alcohols having allyl unsaturation will conform to Formula (IV) herein below:

(IV)

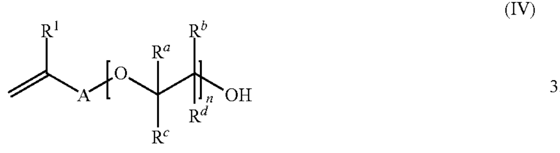

wherein n, A, $R^1$, $R^a$, $R^b$, $R^c$ and $R^d$ have the meanings assigned above. In a preferred embodiment: n is 0; A is either a covalent bond or a $C_1$-$C_{12}$ alkylene group; and, $R^1$ is selected from hydrogen and a $C_1$-$C_6$ alkyl group and, more preferably, from hydrogen and a $C_1$-$C_4$ alkyl group.

Suitable alcohols having allyl unsaturation for use in the present invention include: allyl alcohol; methallyl alcohol; 3-buten-1-ol; isoprenol (3-methyl-3-buten-1-ol); 2-methyl-3-buten-1-ol; 2-methyl-3-buten-2-ol; 1-penten-3-ol; 3-methyl-1-penten-3-ol; and, 4-methyl-1-penten-3-ol. Particular preference is given to using allyl alcohol or methallyl alcohol.

The alkylene oxide conforms to Formula (V) herein below (V)

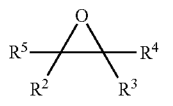

wherein $R^2$, $R^3$, $R^4$ and $R^5$ may be the same or different and are independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen. It is preferred that $R^2$, $R^3$ and $R^5$ are hydrogen and $R^4$ is either a phenyl group or a $C_1$-$C_8$ alkyl group and, more preferably, a $C_1$-$C_4$ alkyl group.

Suitable alkylene oxide reactants include one or more of: propylene oxide; 1,2-butylene oxide; cis-2,3-epoxybutane; trans-2,3-epoxybutane; 1,2-epoxypentane; 1,2-epoxyhexane; decene oxide; and, styrene oxide. Particular preference is given to using propylene oxide.

Any known method for forming such adducts may be employed. However, commonly, in the presence of a basic catalyst, a controlled amount of alkylene oxide is slowly mixed with the preheated alcohol over a reaction time of up to 20 hours and in an amount sufficient to form the desired oxyalkylated reaction product. The unsaturated alcohol should be free of water and may therefore be vacuum stripped in advance of being preheated to a temperature, typically, of from 75 to 150° C.

During the introduction of the oxide, the concentration of unreacted alkylene oxide in the liquid reaction mixture and the current degree of addition of the alkylene oxide onto the unsaturated starter can be monitored by known methods. These methods include, but are not limited to optical methods, such as Infrared and Raman spectroscopy; viscosity and mass flow measurements, after appropriate calibration; measurement of the dielectric constant; and gas chromatography.

If desired, the oxyalkylation may be carried out in a suitable solvent, such as an aromatic hydrocarbon-illustratively toluene or benzene—or, alternatively, an aliphatic hydrocarbon solvent having from 5 to 12 carbon atoms, such as heptane, hexane or octane. Where solvents are used, aliphatic solvents are preferred in order to obviate the potential toxic associations connected with use of aromatic hydrocarbon solvents.

Suitable basic catalysts, which may be used individually or in admixture, include alkali metal hydroxides such as KOH, NaOH and CsOH; alkaline earth metal hydroxides, such as $Ca(OH)_2$ and $Sr(OH)_2$; and, alkali metal alkoxides, such as KOMe, NaOMe, KOt-Bu and NaOt-Bu. The catalysts should typically be employed in an amount of from 0.05 to 0.5 wt. %, based on the total weight of the reactants and can be used either as solids, solutions or suspensions. It is also possible to add only part of the catalyst at the beginning of the reaction and introduce further catalysts in one or more portions at a later point in time; the later added fraction of catalyst may be identical or different to the initial catalyst and the amount of solvent present at each addition of catalyst can be moderated to ensure the efficacy of catalyst.

For completeness, illustrative citations describing the alkoxylation of allyl alcohol include: U.S. Pat. Nos. 9,073,836; 3,268,561; 4,618,703; and, J. Am. Chem. Soc. 71 (1949) 1152.

Siloxanes

Some useful siloxanes are represented by the Formula (II) herein below:

(II)

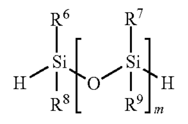

wherein m is 1, 2, 3, 4 or 5, preferably 1; $R^6$, $R^7$, $R^8$ and $R^9$ may be the same or different and each is independently selected from a $C_1$-$C_8$alkyl group, a $C_3$-$C_{10}$ cycloalkyl group, a $C_6$-$C_{18}$ aryl group or a $C_6$-$C_{18}$ aralkyl group.

In a preferred embodiment, the siloxane of Formula (II) is a disiloxane.

In an embodiment, each of $R^6$, $R^7$, $R^8$ and $R^9$ represents a $C_1$-$C_6$ alkyl group or a $C_3$-$C_6$ cycloalkyl group. Preferably, each of $R^6$, $R^7$, $R^8$ and $R^9$ represents a $C_1$-$C_4$ alkyl group or a $C_5$-$C_6$ cycloalkyl group. For example, at least two of $R^6$, $R^7$, $R^8$ and $R^9$ may be a $C_1$-$C_4$ or $C_1$-$C_2$ alkyl group. Most particularly, it is preferred that each of $R^6$, $R^7$, $R^8$ and $R^9$ of Formula (II) are methyl ($C_1$).

For completeness, an illustrative list of siloxanes of Formula (II) include: 1,1,3,3-tetramethyldisiloxane; 1,1,3,3-tetraethyldisiloxane; 1,1,3,3-tetra-n-propyldisiloxane; 1,1,3,3-tetraisopropyldisiloxane; 1,1,3,3-tetra-n-butyldisiloxane; 1,1,3,3-tetraisobutyldisiloxane; 1,1,3,3-tetra-sec-butyldisiloxane; 1,1,3,3-tetra-tert-butyldisiloxane; 1,1,3,3-tetracyclopentyldisiloxane; 1,1,3,3-tetracyclohexyldisiloxane; 1,3-diethyl-1,3-dimethyldisiloxane; 1,3-dimethyl-1,3-di-n-propyldisiloxane; 1,3-dimethyl-1,3-diisopropyldisiloxane; 1,3-di-n-butyl-1,3-dimethyldisiloxane; 1,3-diisobutyl-1,3-dimethyldisiloxane; 1,3-di-sec-butyl-1,3-dimethyldisiloxane; 1,3-di-tert-butyl-1,3-dimethyldisiloxane; 1,3-dicyclopentyl-1,3-dimethyldisiloxane; 1,3-dicyclohexyl-1,3-dimethyldisiloxane; 1,3-diethyl-1,3-di-n-propyldisiloxane; 1,3-diethyl-1,3-diisopropyldisiloxane; 1,3-di-n-butyl-1,3-diethyldisiloxane; 1,3-diisobutyl-1,3-diethyldisiloxane; 1,3-di-sec-butyl-1,3-diethyldisiloxane; 1,3-di-tert-butyl-1,3-diethyldisiloxane; 1,3-dicyclopentyl-1,3-diethyldisiloxane; and, 1,3-dicyclohexyl-1,3-diethyldisiloxane.

The siloxanes of the general Formula (II) may be commercial products or can be prepared by processes known in organosilicon chemistry. For example, the dihydrotetra(organyl) siloxanes are obtainable by hydrolysis of halodi (organyl)-H-silanes. Said halodi (organyl)-H-silanes are themselves either commercially available products or are obtainable by, for example: the direct synthesis of silicon with haloorganyls following the Müller-Rochow process; and, salt elimination reactions of metal organyls-such as Grignard reagents or lithium organyls—with dihalo(organyl) silanes.

Process Conditions

The hydroxyalkyl-allyl ether of Formula (I) and the siloxane of Formula (II) are generally reacted such that the molar ratio of said adduct to said siloxane is equal or higher than 2:1. The reaction can be carried out under atmospheric or elevated pressure. Further, the reaction can be carried out at a temperature from 25 to 250° C. and preferably from 70 to 200° C. And in carrying out the reaction, organic solvents may or may not be used but, when employed, solvents such as toluene, xylene, heptane, dodecane, ditolylbutane, cumene and mixtures thereof are preferred.

The reaction is performed under anhydrous conditions and in the presence of a catalyst. The catalyst used is a transition metal catalyst of which the transition metal is selected from Groups 8 to 10 of the Periodic Table and more usually from the group consisting of ruthenium, rhodium, palladium, osmium, iridium, platinum and combinations thereof.

As illustrative but non-limiting examples of such catalysts may be mentioned: platinum catalysts, such as platinum black powder, platinum supported on silica powder, platinum supported on alumina powder, platinum supported on carbon powder (e.g., activated carbon), chloroplatinic acid, 1,3-divinyltetramethyldisiloxane complexes of platinum, carbonyl complexes of platinum and olefin complexes of platinum; palladium catalysts, such as palladium supported on silica powder, palladium supported on alumina powder, palladium supported on carbon powder (e.g., activated carbon), carbonyl complexes of palladium and olefin complexes of palladium; ruthenium catalysts, such as $RhCl_3(Bu_2S)_3$, ruthenium 1,3-ketoenolate and ruthenium carbonyl compounds such as ruthenium 1,1,1-trifluoroacetylacetonate, ruthenium acetylacetonate and triruthinium dodecacarbonyl; and, rhodium catalysts, such as rhodium supported on silica powder, rhodium supported on alumina powder, rhodium supported on carbon powder (e.g., activated carbon), carbonyl complexes of rhodium and olefin complexes of rhodium. Preferred catalysts take the form of said transition metals supported on a powder such as alumina, silica, or carbon; platinum supported on carbon powder is particularly preferred for use as the catalyst in the present method.

Without intention to limit the catalytic amount of the transition metal catalysts used in step i) of the present method, typically the catalyst is used in an amount that provides from 0.0001 to 1 gram of catalytic metal per equivalent of silicon-bonded hydrogen in the siloxane.

The progress of the reaction and, in particular, the consumption of the unsaturated group of the hydroxyalkyl allyl ether can be monitored by known methods. This aside, the reaction generally requires a time of 0.5 to 72 hours to reach completion, more commonly from 1 to 30 or 1 to 20 hours.

Upon completion of the reaction, it is facile to remove any solid, suspended compounds by, for example, filtration, crossflow filtration or centrifugation. Further, the reaction product may be worked up, using methods known in the art, to isolate and purify the reaction product. For example, any solvent present may be removed by stripping at reduced pressure.

Preparation of Dicarbinol Silicone Polymer-Step ii

In a reaction vessel which is capable of imparting shear to the contents thereof and under polymerization conditions, the reaction product of step i) is reacted with at least one cyclic siloxane. Some useful cyclic siloxanes have the structure of general Formula (III) as described herein below:

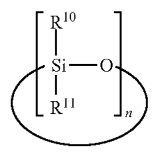

(III)

wherein n is 3, 4, 5, 6, 7 or 8, preferably 4; $R^{10}$ and $R^{11}$ may be the same or different and each is independently selected from hydrogen, a $C_1$-$C_8$alkyl group, a $C_2$-$C_5$ alkenyl group, a $C_3$-$C_{10}$ cycloalkyl group, a $C_6$-$C_{18}$ aryl group or a $C_6$-$C_{18}$ aralkyl group.

Mixtures of co-polymerizable cyclic siloxane monomers can also be used in step ii. Further, while suitable cyclic siloxane monomers will generally contain "n" identical $R^{10}$ groups and "n" identical $R^{11}$ groups, the $R^{10}$ and $R^{11}$ groups attached to a given silicon atom need not necessarily be the same as those attached to an adjacent silicon atom. For example, the monomers $[(C_2H_5)(C_6H_5)SiO]_2$ $[(C_2H_5)_2SiO]$ and $[(C_2H_5)(C_6H_5)SiO][(C_2H_5)_2]SiO]_2$ are considered monomers within the terms of Formula (III).

In an embodiment, each $R^{10}$ and $R^{11}$ may independently represent a $C_1$-$C_8$ alkyl group. An exemplary, but not limiting list of cyclic siloxanes of meeting this embodiment of Formula (III) includes: $[(CH_3)_2SiO]_8$; $[(CH_3)_2SiO]_7$; $[(CH_3)_2 SiO]_6$; decamethylcyclopentasiloxane ($D_5$); octamethylcyclotetrasiloxane ($D_4$); hexamethylcyclotrisiloxane ($D_3$); $[(CH_3)(C_2H_5)SiO]_3$; $[(CH_3)(C_2H_5)SiO]_4$; $[(CH_3)$ $(C_2H_5)SiO]_5$; $[(CH_3)(C_2H_5)SiO]_6$; $[(C_2H_5)_2SiO]_3$; $[(C_2H_5)_2SiO]_4$; and, $[(C_2H_5)_2SiO]_5$. Within said embodiment, it is preferred that $R^{10}$ and $R^{11}$ are the same. More particularly, it is preferred that $R^{10}$ and $R^{11}$ of the cyclic siloxanes of Formula (III) are both methyl ($C_1$). Good results have, for instance, been obtained when the cyclic siloxane of Formula (III) is octamethylcyclotetrasiloxane ($D_4$).

Further useful cyclic siloxane monomers of Formula (III) include: octaphenylcyclotetrasiloxane; tetramethylcyclotetrasiloxane; tetramethyltetravinylcyclotetrasiloxane; $[(C_6H_5)_2SiO]_3$; $[(C_2H_5)(C_6H_5)SiO]_3$; and, $[(C_2H_5)(C_6H_5)SiO]_4$.

While there is not specific intention to limit the mechanism of ring opening polymerization employed in the present invention and while therefore ring opening polymerization of cyclic siloxane monomers by the anionic route, via basic catalysis is not strictly precluded, it is preferred herein for said polymerization to proceed by a cationic route, via acid catalysis. Broadly, any suitable acidic ring opening polymerization catalyst may be utilized herein and, equally, mixtures of catalysts may be employed. Both Lewis and Bronsted acids may be suitable in this context, but the latter are preferred as they tend to be effective at temperatures of less than 150° C. and are usually effective at temperatures of from 50 to 100° C.

Examples of suitable Lewis acids include but are not limited to: $BF_3$; $AlCl_3$; t-BuCl/$Et_2AlCl$; $Cl_2/BCl_3$; $AlBr_3$; $AlBr_3$. $TiCl_4$; 12; $SbCl_5$; $WCl_6$; $AlEt_2Cl$; $PF_5$; $VCl_4$; $AlEtCl_2$; $BF_3Et_2O$; $PCl_5$; $PCl_3$; $POCl_3$; $TiCl_3$; and, $SnCl_4$.

Examples of Bronsted acid or proton acid type catalysts-which may optionally be disposed on solid, inorganic supports-include, but are not limited to: HCl; HBr; HI; $H_2SO_4$; $HClO_4$; para-toluenesulfonic acid; trifluoroacetic acid; and, perfluoroalkane sulfonic acids, such as trifluoromethane sulfonic acid (or triflic acid, $CF_3SO_3H$), $C_2F_5SO_3H$, $C_4F_9SO_3H$, $C_5F_{11}SO_3H$, $C_6F_{13}SO_3H$ and $C_8F_{17}SO_3H$. The most preferred of these strong acids is trifluoromethane sulfonic acid (triflic acid, $CF_3SO_3H$).

The catalysts for said ring opening polymerization may usually be employed at a concentration of from 1 to 1000 ppm by weight based on the total weight of the cyclic siloxane monomers to be polymerized. Preferably from 5 to 150 ppm by weight are used, most preferably from 5 to 50 ppm. The catalytic amount may be reduced when the temperature at which the monomers and the catalyst are contacted is increased.

The ring opening polymerization may conveniently be carried out at a temperature in the range from 10 to 150° C. Preferably, however, the temperature range is from 20 or 50 to 100° C. as obviating high temperatures can limit the loss of volatile cyclic siloxanes from the reaction mixture due to their lower boiling point.

The process pressure is not critical. As such, the polymerization reaction can be run at sub-atmospheric, atmospheric, or super-atmospheric pressures but pressures at or above atmospheric pressure are preferred.

The reaction should be performed under anhydrous conditions and in the absence of any compound having an active hydrogen atom. Exposure to atmospheric moisture may be avoided by providing the reaction vessel with an inert, dry gaseous blanket. While dry nitrogen and argon may be used as blanket gases, precaution should be used when common nitrogen gas is used as a blanket, because such nitrogen may not be dry enough on account of its susceptibility to moisture entrainment; the nitrogen may require an additional drying step before its use herein.

The duration of the reaction is dependent on the time taken for the system to reach equilibrium. Equally, however, it is understood that the desired product can be obtained by stopping the equilibration at exactly the desired time: for example, the reaction can be monitored by analyzing viscosity over time or by analyzing monomer conversion using gas chromatography and the reaction stopped when the desired viscosity or monomer conversion is attained. These considerations aside, the polymerization reaction generally takes place for from 0.5 to 72 hours and more commonly from 1 to 30 or 1 to 20 hours. Acid catalysts present in the reaction mixture at the end of the polymerization reaction can easily be neutralized in order to stabilize the reaction product.

Upon completion of the polymerization, it is possible to remove any solid, suspended compounds by, for example, filtration, crossflow filtration or centrifugation. Further, the output of the polymerization may be worked up, using methods known in the art, to isolate and purify the hydroxyl-functionalized polysiloxanes. Mention in this regard may be made of extraction, evaporation, distillation and chromatography as suitable techniques. Upon isolation, it has been found that typical yields of the hydroxyl-functionalized polysiloxanes are at least 40% and often at least 60%.

The hydroxyl-functionalized polysiloxanes disclosed herein invention may possess a molecular weight (Mn) of from 500 to 150000 g/mol, preferably from 5000 to 100000, more preferably from 10000 to 100000. Moreover, the polymers may be characterized by a polydispersity index in the range from 1.0 to 5.0, preferably from 1.0 to 2.5.

Preparation of UV Curable, (Meth)Acrylate Terminated Polysiloxane Polymer

The dicarbinol silicone polymer is reacted with a (meth) acrylate terminated isocyanate to form the final diacrylate terminated silicone polymer.

Useful (meth)acrylate terminated isocyanate reactants are not limited and include mono and polyisocyanates comprising (meth)acrylate functionality. Useful (meth)acrylate terminated isocyanate reactants include those of Formula VI:

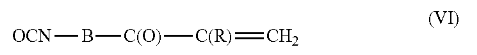

(VI)

wherein B can be alkylene, heteroalkylene, polyether and combinations thereof. In some embodiments B is $—[CH_2]_p—[ZO]_x—$ where Z is alkyl, p is 0 to 10, preferably 2 or 3 and x is 0 to 10. In one embodiment B is $—[alkyl\text{-}O\text{-}]_p$ and p is 1 to 10. Some exemplary (meth)acrylate terminated isocyanate reactants include acryloxyethylisocyanate (AOI) and methacryloxyethylisocyanate (MOI).

The stoichiometric ratio of NCO groups of the (meth) acrylate terminated isocyanate with respect to OH groups of the dicarbinol silicone polymer is chosen to provide a desired functionality. A theoretical ratio of 1 NCO group to 1 OH group will provide a diacrylate terminated silicone polymer.

Reaction of the (meth)acrylate terminated isocyanate reactant with the dicarbinol silicone polymer is typically performed under anhydrous conditions, elevated temperatures and in the presence of a polyurethane catalyst. Useful temperatures for this reaction range from room temperature to 160° C.

In principle, any compound that can catalyze the reaction of a hydroxyl group and an isocyanato group to form a urethane bond can be used. Some useful examples include: tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters; dibutyltin bisacetylacetonate; titanates such as tetrabutyl titanate and tetrapropyl titanate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris (dimethylaminomethyl) phenol, 2,2'-dimorpholinodiethylether, triethylenediamine, morpholine, N-methylmorpholine, 2-ethyl-4-methylimidazole and 1,8-diazabicyclo-(5,4,0)-undecene-7 (DBU); aliphatic carboxylate salts or acetylacetonates of potassium, iron, indium, zinc, bismuth, or copper.

The catalyst is preferably present in an amount of from 0.005 to 3.5 wt. % based on the total composition weight.

Preparation of UV Curable (Meth)Acrylate Terminated Polysiloxane Polymer by Reaction of One or More Cyclic Siloxanes and One or More Dimethacrylate Siloxane(s)

In another embodiment one or more cyclic siloxane(s) is (are) reacted with one or more dimethacrylate siloxane(s) to form a diacrylate terminated silicone polymer. Useful cyclic siloxanes for this embodiment are disclosed above. Useful dimethacrylate siloxanes include those having a MA-R-[Si$(CH_3)(CH_3)$-O]$_n$-Si$(CH_3)(CH_3)$-R-MA structure wherein each MA is independently a (meth)acrylate group, each R is independently an alkylene group and preferably a $C_1$-$C_8$alkylene group and more preferably a $C_1$-$C_3$ alkylene group, and n is 1, 2, 3, 4 or 5, preferably 1. Examples of useful dimethacrylate siloxanes include Gelest 1402.0 available from Gelest Inc. and X-22-164 available from ShinEtsu.

The cyclic siloxane and the dimethacrylate siloxane are generally reacted such that the molar ratio of cyclic siloxane to dimethacrylate siloxane is 1 to 5000. The reaction can be carried out under atmospheric or elevated pressure. Further, the reaction can be carried out at a temperature from 25 to 250° C. and preferably from 70 to 200° C. And in carrying out the reaction, organic solvents may or may not be used but, when employed, solvents such as toluene, xylene, heptane, dodecane, ditolylbutane, cumene and mixtures thereof are preferred. Ring opening catalysts as disclosed above can be used in the reaction. Radical polymerization inhibitors such as hydroquinone monomethyl ether (MEHQ) can be used to moderate and inhibit the reaction.

The duration of the reaction is dependent on the time taken for the system to reach equilibrium. Equally, however, it is understood that the desired product can be obtained by stopping the equilibration at exactly the desired time: for example, the reaction can be monitored by analyzing viscosity over time or by analyzing monomer conversion using gas chromatography and the reaction stopped when the desired viscosity or monomer conversion is attained. These considerations aside, the polymerization reaction generally takes place for from 0.5 to 72 hours and more commonly from 1 to 20 or 1 to 10 hours or 1 to 5 hours. Acid catalysts present in the reaction mixture at the end of the polymerization reaction can easily be neutralized in order to stabilize the reaction product.

Preparation of UV Curable (Meth)Acrylate Terminated Polysiloxane Polymer by Reaction of an Amine Terminated Siloxane and a (Meth)Acrylate Terminated Isocyanate In another embodiment one or more amine terminated siloxane(s) is (are) reacted with one or more (meth)acrylate isocyanate to form a diacrylate terminated silicone polymer. Useful amine terminated siloxanes for this embodiment include those having a AM-R-[Si$(CH_3)(CH_3)$-OIn-Si$(CH_3)(CH_3)$-R-AM structure wherein each AM is independently an —$NX_1X_2$ group where $X_1$ and $X_2$ each independently comprise H or alkyl with the proviso that at least one of $X_1$ and $X_2$ is H and preferably both of $X_1$ and $X_2$ are H; each R is independently an alkylene group and preferably a $C_1$-$C_8$alkylene group and more preferably a $C_1$-$C_8$alkylene group, and n is 1 to 20000. Examples of useful amine terminated siloxanes include aminopropyl terminated polydimethylsiloxane sold under the name DMS-A35 available from Gelest Inc. and metharyl-modified silicone fluids sold by ShinEtsu.

Useful (meth)acrylate terminated isocyanates are disclosed above in Formula VI. Some exemplary (meth)acrylate terminated isocyanate reactants include acryloxyethylisocyanate (AOI) and methacryloxyethylisocyanate (MOI).

The stoichiometric ratio of NCO groups of the (meth) acrylate terminated isocyanate with respect to amine groups of the amine terminated siloxane is chosen to provide a desired functionality. A theoretical ratio of 1 NCO group to 1 amine group will provide a diacrylate terminated silicone polymer.

Reaction of the (meth)acrylate terminated isocyanate reactant with the amine terminated siloxane is typically performed under anhydrous conditions, elevated temperatures and in the presence of a polyurethane catalyst. Useful temperatures for this reaction range from room temperature to 160° C.

In principle, any compound that can catalyze the reaction of an amine group and an isocyanato group to form a urethane bond can be used. Some useful examples of urethane catalysts are disclosed above. The catalyst is preferably present in an amount of from 0.005 to 3.5 wt. % based on the total composition weight.

The duration of the reaction is dependent on the time taken for the system to reach equilibrium. Equally, however, it is understood that the desired product can be obtained by stopping the equilibration at exactly the desired time: for example, the reaction can be monitored by analyzing isocyanate content and the reaction stopped when the desired urethane conversion is attained. These considerations aside, the polymerization reaction generally takes place for from 0.5 to 72 hours and more commonly from 1 to 20 or 1 to 10 hours or 1 to 5 hours.

Preparation of UV Curable (Meth)Acrylate Terminated Polysiloxane Polymer by Reaction of an Amine Terminated Siloxane and an Acrylic Acid Chloride In another embodiment one or more amine terminated siloxane(s) is (are) reacted with one or more acrylic acid chlorides to form a diacrylate terminated silicone polymer. Useful amine terminated siloxanes are disclosed above. Some exemplary acrylic acid chlorides include (meth)acrylate chlorides, 2-propenoyl chloride or acryloy! chloride.

The stoichiometric ratio of acryloyl groups of the acrylic acid chloride with respect to amine groups of the amine terminated siloxane is chosen to provide a desired functionality. A theoretical ratio of 1 acryloyl group to 1 amine group will provide a diacrylate terminated silicone polymer.

The reaction can be carried out under atmospheric or elevated pressure. The reaction is typically carried out below room temperature, for example at a temperature from 0 to 40° C. and preferably from 0 to 25° C. And in carrying out the reaction, organic solvents may or may not be used but, when employed, solvents such as toluene, xylene, heptane, dodecane, ditolylbutane, cumene and mixtures thereof are preferred. A base such as triethylamine can be used to remove hydrogen chloride formed during the reaction. Polymerization inhibitors such as hydroquinone monomethyl ether (MEHQ) can be used to moderate and inhibit the reaction.

The duration of the reaction is dependent on the time taken for the system to reach equilibrium. Equally, however, it is understood that the desired product can be obtained by stopping the equilibration at exactly the desired time: for example, the reaction can be monitored by analyzing isocyanate content and the reaction stopped when the desired urethane conversion is attained. These considerations aside, the polymerization reaction generally takes place for from 0.5 to 72 hours and more commonly from 1 to 20 or 1 to 10 hours or 1 to 5 hours.

Poly(Meth)Acrylate Terminated PDMS Oligomer Component

The disclosed composition can comprise one poly(meth) acrylate terminated PDMS oligomer or a mixture of different poly(meth)acrylate terminated PDMS oligomers. Useful poly(meth)acrylate oligomers have two (meth)acrylate functional groups that are reactive with other components of the composition and a polydimethyl siloxane (PDMS) backbone. Compounds having three or more (meth)acrylate groups are preferably not used in the disclosed compositions. Preferably, the poly(meth)acrylate terminated PDMS oligomer is telechelic with the (meth)acrylate functional groups located at the chain ends and free of pendent functional groups. Poly(meth)acrylate terminated PDMS oligomers will typically have a molecular weight of 30,000 g/mol or less, in some embodiments 12,000 g/mol or less, in some embodiments 5,000 g/mol or less and in other embodiments 1,000 g/mol or less.

In one embodiment the poly(meth)acrylate terminated PDMS oligomer will have the following polydimethyl siloxane (PDMS) structure:

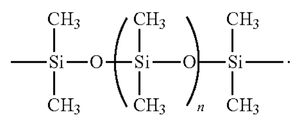

n is an integer in the range of 1 to about 400, for example 1 or greater, or 10 or greater, or 15 or greater and 400 or less, or 160 or less, or 100 or less, or 40 or less or 20 or less or 10 or less.

In one embodiment the poly(meth)acrylate terminated PDMS oligomer will have two, independently chosen (meth)acrylate functional groups bonded to the terminal Si atoms. Each (meth)acrylate functional group is independently chosen from the structure:

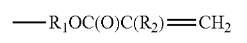

R1 is an alkyl group, an alkenyl group or a heterocyclo group. $R_2$ is H or alkyl, preferably H or $CH_3$.

The alkyl group on the (meth)acrylate desirably may be a substituted or unsubstituted alkyl group having 1 to 20 carbon atoms, desirably 1 to 10 carbon atoms, optionally having at least one substituent selected from an alkyl group having 1 to 10 carbon atoms, substituted or unsubstituted cycloalkyl group having 1 to 20 carbon atoms, desirably 1 to 10 carbon atoms, substituted or unsubstituted bicyclo or tricycloalkyl group having 1 to 20 carbon atoms, desirably 1 to 15 carbon atoms, an alkoxy group having 1 to 10 carbon atoms, an aryloxy group having 6 to 10 carbon atoms.

The alkenyl group on the (meth)acrylate desirably may be a substituted or unsubstituted alkenyl group having 2 to 20 carbon atoms, desirably 2 to 10 carbon atoms, optionally having at least one substituent selected from an alkyl group having 1 to 10 carbon atoms, an alkoxy group having 1 to 10 carbon atoms, an aryloxy group having 6 to 10 carbon atoms, an epoxy group having 2 to 10 carbon atoms, hydroxyl and the like.

The heterocyclo group on the (meth)acrylate desirably may be a substituted or unsubstituted heterocyclo group having 2 to 20 carbon atoms, desirably 2 to 10 carbon atoms, containing at least one hetero atom selected from N and O, and optionally having at least one substituent selected from an alkyl group having 1 to 10 carbon atoms, an alkoxy group having 1 to 10 carbon atoms, an aryloxy group having 6 to 10 carbon atoms, or an epoxy group having 2 to 10 carbon atoms.

Useful poly(meth)acrylate terminated PDMS oligomers include X-22-2445 and X-22-164 series available from Shin-Etsu Silicones of America, Inc.

Mono(Meth)Acrylate PDMS Oligomer Component

The disclosed composition can comprise one mono(meth) acrylate terminated PDMS oligomer or a mixture of different mono(meth)acrylate terminated PDMS oligomers. Mono (meth)acrylate compounds have one (meth)acrylate functional group positioned terminally to a polydimethyl siloxane backbone. Typically the mono(meth)acrylate compounds will have a molecular weight of 12,000 or less or 3,000 or less.

In one embodiment the mono(meth)acrylate terminated PDMS monomer will have the following polydimethyl siloxane (PDMS) structure:

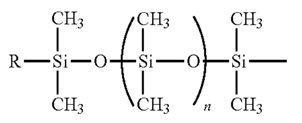

R is a hydrocarbyl moiety such as an alkyl group or a heterocarbyl moiety such as a heteroalkyl group. n is an integer in the range of 1 to about 160, for example 1 or greater, or 10 or greater, or 15 or greater and 160 or less, or 150 or less, or 100 or less, or 40 or less or 20 or less or 10 or less.

In one embodiment the mono(meth)acrylate terminated PDMS oligomer will have one (meth)acrylate functional group bonded to a terminal Si atom. The (meth)acrylate functional group is chosen from the structure:

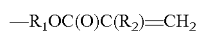

R1 is an alkyl group, an alkenyl group or a heterocyclo group. $R_2$ is H or alkyl, preferably H or $CH_3$.

The alkyl group on the (meth)acrylate desirably may be a substituted or unsubstituted alkyl group having 1 to 20 carbon atoms, desirably 1 to 10 carbon atoms, optionally having at least one substituent selected from an alkyl group having 1 to 10 carbon atoms, substituted or unsubstituted cycloalkyl group having 1 to 20 carbon atoms, desirably 1 to 10 carbon atoms, substituted or unsubstituted bicyclo or tricycloalkyl group having 1 to 20 carbon atoms, desirably 1 to 15 carbon atoms, an alkoxy group having 1 to 10 carbon atoms, an aryloxy group having 6 to 10 carbon atoms.

The alkenyl group on the (meth)acrylate desirably may be a substituted or unsubstituted alkenyl group having 2 to 20 carbon atoms, desirably 2 to 10 carbon atoms, optionally having at least one substituent selected from an alkyl group having 1 to 10 carbon atoms, an alkoxy group having 1 to 10 carbon atoms, an aryloxy group having 6 to 10 carbon atoms, an epoxy group having 2 to 10 carbon atoms, hydroxyl and the like.

The heterocyclo group on the (meth)acrylate desirably may be a substituted or unsubstituted heterocyclo group having 2 to 20 carbon atoms, desirably 2 to 10 carbon atoms, containing at least one hetero atom selected from N and O, and optionally having at least one substituent selected from an alkyl group having 1 to 10 carbon atoms, an alkoxy group having 1 to 10 carbon atoms, an aryloxy group having 6 to 10 carbon atoms, or an epoxy group having 2 to 10 carbon atoms.

Some exemplary mono-functional (meth)acrylate oligomers include, but are not limited to, X-174 series and X-22-2426 series available from Shin-Etsu Silicones of America, Inc.

Surface Treated Hydrophobic Fumed Silica

Uncured compositions will further comprise a specific range of surface treated hydrophobic fumed silica component. The surface treated hydrophobic fumed silica component can be a single surface treated hydrophobic fumed silica material or a combination of different surface treated hydrophobic fumed silica materials.

Hydrophobic fumed silica materials are typically prepared by precipitation or flame hydrolysis (pyrogenic process). The untreated fumed silica material is hydrophilic due to the projecting silanol (—Si—OH) groups on the material. The hydrophobic behavior is brought about by reacting the hydrophilic silanol groups with specific organic compounds. Typical organic compounds include HMDS (hexamethyldisilazane), DDS (dimethyldichlorosilane) and silicone oil. After reaction the organic groups are anchored firmly to the silica structure.

The hydrophobic fumed silica material advantageously has a BET surface area from 90 to 300 $m^2/g$, preferably 150 to 290 and more particularly about 190 to 250.

Hydrophobic fumed silica materials are commercially available from Applied Material Solutions as AMSIL; Cabot Corporation as CAB-O-SIL; Wacker Brennetag as HDK Silica; and Evonik Corporation as AEROSIL. One useful hydrophobic fumed silica material is Aerosil R812S from Evonik Corporation. Aerosil R812S is described as being prepared by the flame hydrolysis process with the silanol groups reacted with HMDS (hexamethyldisilazane).

Reaction Initiator

The curable compositions can optionally comprise one or more reaction-initiators. The reaction initiators can be a thermal initiator, a photoinitator or both a thermal initiator and a photoinitator. Thermal or heat cure initiators comprise an ingredient or a combination of ingredients which at the desired elevated temperature conditions will initiate and/or accelerate crosslinking and curing of a composition. Useful, non-limiting examples of heat cure initiators include peroxy materials, e.g., peroxides, hydroperoxides, and peresters, which under appropriate elevated temperature conditions decompose to form peroxy free radicals which are initiatingly effective for the polymerization of the curable elastomeric sealant compositions. If used, the peroxy materials may be employed in concentrations effective to initiate curing of the curable elastomeric sealant composition at a desired temperature. Another useful class of heat-curing initiators comprises azonitrile compounds, such as described in U.S. Pat. No. 4,416,921, the disclosure of which is incorporated herein by reference. Azonitrile initiators are commercially available, e.g., the initiators which are commercially available under the trademark VAZO from E. I. DuPont de Nemours and Company, Inc., Wilmington, DE. The curable compositions may comprise 0 wt. % up to 5 wt. % of one or more heat cure initiators based on the total weight of the composition.

Photoinitiators will initiate and/or accelerate crosslinking and curing of a composition when exposed to actinic radiation such as, for example, visible radiation and UV radiation. Useful, non-limiting examples of photoinitiators include, one or more selected from the group consisting of benzyl ketals, hydroxyl ketones, amine ketones and acylphosphine oxides, such as 2-hydroxy-2-methyl-1-phenyl-1-acetone, diphenyl (2,4,6-triphenylbenzoyl)-phosphine oxide, 2-benzyl-dimethylamino-1-(4-morpholinophenyl)-butan-1-one, benzoin dimethyl ketal dimethoxy acetophenone, α-hydroxy benzyl phenyl ketone, 1-hydroxy-1-methyl ethyl phenyl ketone, oligo-2-hydoxy-2-methyl-1-(4-(1-methyvinyl)phenyl)acetone, benzophenone, methyl o-benzyl benzoate, methyl benzoylformate, 2-diethoxy acetophenone, 2,2-d isec-butoxyacetophenone, p-phenyl benzophenone, 2-isopropyl thioxanthenone, 2-methylanthrone, 2-ethylanthrone, 2-chloroanthrone, 1,2-benzanthrone, benzoyl ether, benzoin ether, benzoin methyl ether, benzoin isopropyl ether, α-phenyl benzoin, thioxanthenone, diethyl thioxanthenone, 1,5-acetonaphthone, 1-hydroxycyclohexylphenyl ketone, ethyl p-dimethylaminobenzoate, trimethyl benzoyl diphenylphosphine oxide (TPO) and TPO based photoinitators. These photoinitiators may be used individually or in combination which each other.

Optional Additives

The uncured compositions disclosed herein can further optionally comprise one or more additives known for use in curable compositions, for example plasticizer, stabilizer, filler, colorant, drying agent, reactive diluent, rheological adjuvant, additional polymer or prepolymer, adhesion promoter, catalyst. The uncured compositions disclosed herein can also be free of any and all additives known for use in curable compositions.

The curable compositions can optionally comprise one or more plasticizers. A "plasticizer" is a substance that decreases the viscosity of the composition and thus facilitates its processability. The plasticizer is preferably selected from the group consisting of: nonfunctional polydimethylsiloxanes (PDMS); diurethanes; ethers of monofunctional, linear or branched C4-C16 alcohols, such as Cetiol OE (obtainable from Cognis Deutschland GmbH, Düsseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS). In some embodiments only reactive plasticizers are used to lessen the potential for non-reactive plasticizers to leach from the cured composition. The curable compositions can optionally comprise 0 wt. % up to 40 wt. % of one or more plasticizers based on the total weight of the composition.

The curable compositions can optionally comprise one or more stabilizers. A "stabilizer" can be one or more of antioxidants, UV stabilizers or hydrolysis stabilizers. Standard commercial examples of stabilizers suitable for use herein include p-methoxyphenol (MEHQ) sterically hindered phenols, thioethers, substituted benzotriazoles and/or amines, for example hindered amine light stabilizer (HALS) type. It is preferred in the context of the present invention that a UV stabilizer that carries a silyl group- and becomes incorporated into the end product upon crosslinking or curing—be used: the products Lowilite™ 75, Lowilite™ 77 (Great Lakes, USA) are particularly suitable for this purpose. Benzotriazoles, benzophenones, benzoates, cyanoacrylates, acrylates, sterically hindered phenols, phosphorus and/or sulfur can also be added. The curable compositions may comprise 0 wt. % up to 10 wt. % of one or more stabilizers based on the total weight of the composition. UV stabilizers are preferably limited to about 1,000 ppm or less.

The curable compositions can optionally comprise one or more fillers.

Some suitable fillers include, for example, lime powder, untreated precipitated and/or pyrogenic silicic acid, zeolites, bentonites, carbonates such as calcium carbonate and magnesium carbonate, diatomite, alumina, clay, talc, metal oxide such as titanium oxide, iron oxide and zinc oxide, sand, quartz, flint, mica, glass powder, and other ground mineral substances. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 $m^2/g$. When they are used, they do not cause any additional increase in the viscosity of the composition according to the present invention, but do contribute to strengthening the cured composition.

It is likewise conceivable to use pyrogenic and/or precipitated silicic acids having a higher BET surface area, advantageously from 100 to 250 $m^2/g$, in particular from 110 to 170 $m^2/g$, as a filler because of the greater BET surface area, the effect of strengthening the cured composition is achieved with a smaller proportion by weight of silicic acid.

The curable compositions may comprise 0 wt. % up to 80 wt. % of one or more fillers based on the total weight of the composition.

The curable compositions can optionally comprise one or more drying agents. The drying agents are moisture scavengers that stabilize the compositions with respect to moisture. Useful drying agents include vinyl silane-trimethoxyvinylsilane (VTMO). The curable compositions may comprise 0 wt. % up to 10 wt. % of one or more moisture scavengers based on the total weight of the composition.

The curable compositions can optionally comprise one or more rheological adjuvants. Rheological adjuvants impart thixotropy to the composition and include, for example, hydrogenated castor oil, fatty acid amides, or swellable plastics such as PVC. The curable compositions may comprise 0 wt. % up to 15 wt. % of one or more rheological adjuvants based on the total weight of the composition.

Reactive diluents include all compounds that are miscible with the composition and provide a reduction in viscosity and that possess at least one group that is reactive or can form bonds with the composition can be used as reactive diluents. Reactive diluents typically have a viscosity of 5 cP to 3,000 cP at room temperature. Reactive diluents can comprise monofunctional polysiloxanes such as (meth)acrylate functionalized polysiloxane and organic compounds such as mono-functional (meth)acrylates, (meth)acrylamides, (meth)acrylic acid and combinations thereof. Illustrative examples of useful mono-functional (meth)acrylates include alkyl (meth)acrylates, cycloalkyl (meth)acrylates, alkenyl (meth)acrylates, heterocycloalkyl (meth)acrylates, heteroalkyl methacrylates, alkoxy polyether mono(meth) acrylates.

Some exemplary (meth)acrylamides may be unsubstituted (meth)acrylamides, N-alkyl substituted (meth)acrylamides or N,N-dialkyl substituted (meth)acrylamides. In the N-alkyl substituted (meth)acrylamides, the alkyl substituent desirably has 1 to 8 carbon atoms, such as N-ethyl acrylamide, N-octyl acrylamide and the like. In the N,N-dialkyl substituted (meth)acrylamides, the alkyl substituent desirably has 1 to 4 carbon atoms, such as N, N-dimethyl acrylamide and N,N-diethyl acrylamide.

The organic diluent is desirably a low viscosity liquid that is compatible with silicone hybrid polymer at normal temperature. The term "normal temperature" or "room temperature" means about 25° C. The curable compositions may comprise 0 wt. % up to 60 wt. % of one or more reactive diluents based on the total weight of the composition.

The curable compositions can optionally comprise one or more additional polymers or prepolymers or oligomers different from the (meth)acrylate functionalized polysiloxane polymer and having a molecular weight of 5,000 or more. Additional polymers or pre-polymers can be selected in this context from polyesters, polyoxyalkylenes, polyacrylates, polymethacrylates, polydialkylsiloxanes, polyhedral oligomeric silsesquioxanes, functionalized polyhedral oligomeric silsesquioxanes or mixtures thereof. Additional polymers or pre-polymers can be reactive with the composition or non-reactive with the composition. The curable compositions may comprise 0 wt. % up to 25 wt. % of one or more additional polymers based on the total weight of the composition.

The adhesive composition according to the disclosure can optionally comprise one or more adhesion promoters. An adhesion promoter is a substance which improves the adhesion properties of the composition to a surface. It is possible to use conventional adhesion promoters known to the person skilled in the art individually or in combination. Examples of suitable adhesion promoters include organo-silanes such as amino silanes, epoxy silanes and oligomeric silane compounds. The adhesion promoter, if more reactive than the silane-functional polymer with moisture, can also serve as a moisture scavenger. The curable compositions may comprise 0 wt. % up to 5 wt. % of one or more adhesion promoters based on the total weight of the composition.

The curable composition additives can optionally comprise of one or more additional additives that can impart improved properties to these compositions. For instance, the additives may impart one or more of: improved elastic properties; longer enabled processing time; faster curing time; and, lower residual tack. Included among such adjuvants and additives are catalyst, antioxidant, fungicides, flame retardants, and/or optionally also, to a small extent, solvents. Additional additives can be added in amounts that do not affect the desired properties of the uncured composition and cured reaction products thereof. The curable compositions may comprise 0 wt. % up to 10 wt. % of one or more additional additives based on the total weight of the composition.

In one embodiment the curable composition will comprise the (meth)acrylate functionalized polysiloxane polymer(s). The curable composition can optionally be essentially free of (e.g.no more than an impurity amount such as less than 0.5 wt. % or less than 0.1 wt. % of the total composition), or completely free of, any of the above components, additives and additional additives in some embodiments.

In one embodiment the curable composition comprises the components and amounts in the following Table. The range and preferred range are both wt. %.

| Component | range | preferred range |
|---|---|---|
| (meth)acrylate functionalized polysiloxane polymer(s) | 20-80 | 40-70 |
| di(meth)acrylate terminated PDMS oligomer | 0-50 | 10-30 |
| mono(meth)acrylate terminated PDMS oligomer | 0-50 | 10-30 |
| additional polymers | 0-25 | 0-25 |
| reaction initiator | 1-5 | 2-3 |
| surface treated hydrophilic fumed silica component | 0-30 | 5-10 |
| additive(s) | 0-10 | 0-5 |

The disclosed compositions will be a clear to cloudy liquid at room temperature and have a viscosity of 10000 cps or lower at room temperature. Preferably the disclosed compositions will be a liquid at room temperature with a viscosity of 5,000 cps or lower at room temperature.

Cured reaction products of the disclosed compositions will be solid at room temperature and will desirably not have a tacky surface. The cured reaction products will have a compression set of 60% or less. Preferably the cured reaction products will have a compression set of 50% or less and even more preferably 40% or less. In some embodiments the cured reaction products will have a compression set of 35% or less and even more preferably 30% or less. In some embodiments the cured reaction products will have a compression set of 20% to 10%!

In some embodiments a tensile strength @ yield of 0.5 $N/mm^2$ or more is useful, a tensile strength @ yield of 1.0 $N/mm^2$ is desirable and a tensile strength @ yield of 2.0 $N/mm^2$ is even more desirable.

In one embodiment the disclosed composition can be cured by exposure to heat and/or exposure to actinic radiation such as visible radiation (about 380 to about 780 nm) or ultraviolet (UV) radiation (about 100 to about 400 nm) or infrared radiation (about 780 to 1,000 nm).

In another embodiment the disclosed compositions find use in a resin used in additive manufacturing, also known in some embodiments as three-dimensional printing and stereolithography. In conventional additive manufacturing techniques, data of the three-dimensional size and shape of a final article is obtained. The data is used to generate a plurality of slices or sections or layers that combined represent the three-dimensional size and shape of that final article. A layer of the final article is formed from the resin and that layer is cured to form an intermediate object. Subsequent layers are formed and cured on the preceding layer in the same fashion until the intermediate object achieves the three-dimensional size and shape of the final article.

Preferred embodiments for the disclosed compositions involve two additive manufacturing techniques: one in which new cured material is formed at the top surface of the intermediate object and another in which new cured material is formed at the bottom surface of the intermediate object. In either technique the disclosed composition in uncured liquid form is held in a reservoir or basin. A platform having a build surface is disposed into the basin so that the build surface is in contact with the curable composition. The composition adjacent the build surface is irradiated in a pattern predetermined from the final article three-dimensional size and shape. The irradiated composition is cured and turns into a solid intermediate object on the build surface. If new cured material is formed at the top surface of the intermediate object, then after each irradiation the build surface and intermediate object under construction is lowered into the basin and resin contacts the intermediate object top surface. A new irradiation takes place and cures the composition onto some or all of the intermediate object top surface. If new cured material is formed at the bottom of the intermediate object, then after each irradiation the build surface and intermediate object can be raised slightly in the basin and liquid resin contacts the intermediate object bottom surface. A new irradiation takes place and cures the composition onto some or all of the intermediate object bottom surface. In either technique the process is repeated until the intermediate object is formed into the three-dimensional size and shape of the final article.

Disclosures of additive manufacturing can be found, for example, in International patent publication WO2019/055645; U.S. Pat. Nos. 5,236,637, 6,540,045, 6,413,697, 7,195,472, 9,598,606 and U.S. patent publications 2007/0116311 and 2017/0173873. The entire contents of each of the above are incorporated by reference herein. Useful equipment for additive manufacturing with the disclosed composition include the LOCTITE PR10 available from Henkel Corporation.

Various features and embodiments of the disclosure are described in the following examples, which are intended to be representative and not limiting.

EXAMPLES

Preparation of Radiation Curable (Meth)Acrylate Terminated Polysiloxane Polymer

Example 1: Synthesis of Radiation Curable, (Meth)Acrylate Terminated Polysiloxane Polymer 1

1

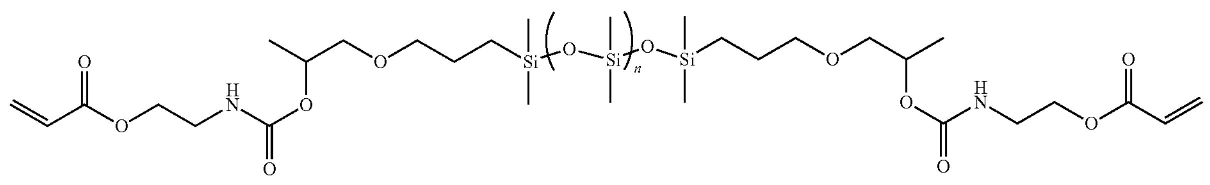

To a 500 mL reactor was added octamethylcyclotetrasiloxane $(D_4)_{200}$g, 2-hydoxypropoxy-ethyl disiloxane 9.0g and trifluoromethanesulfonic acid 100 μL. The reaction mixture was heated up to 90° C. with an agitation rate at 150 rpm, and stir at 90° C. for additional 2 hours. Sodium bicarbonate ($NaHCO_3$) 3.2g was then added to neutralize the acid. The reaction mixture was mixed at 90° C. for another 30 min before cooling down. The reaction mixture was filtered through a 2 micron filter pad and followed with vacuum stripping to obtain the di-carbinol silicone polymer. GPC analysis (PS standard): Mw 21969, Mn 12290, Mp 22145, PDI 1.79.

To a 500 ml reactor was added the carbinol silicone polymer (Mw 21969) 128.9. The reactor was then placed into a 55° C. bath, and vacuumed at 3 mbar for 2 hours with stir. After the vacuum, the reactor was refilled with dry $N_2$ gas. Reaxis 216 0.0176g was added at this temperature, and stirred for 10 min before acryloxyethylisocyanate (AOI) 3.13g was added. The mixture was stirred for additional 2 hours. VTMO 2.60g was then added and mixed for 10 min before cooling down to obtain the silicone diacrylate polymer.

Example 2: Synthesis of Radiation Curable, (Meth)Acrylate Terminated Polysiloxane Polymer 2

2

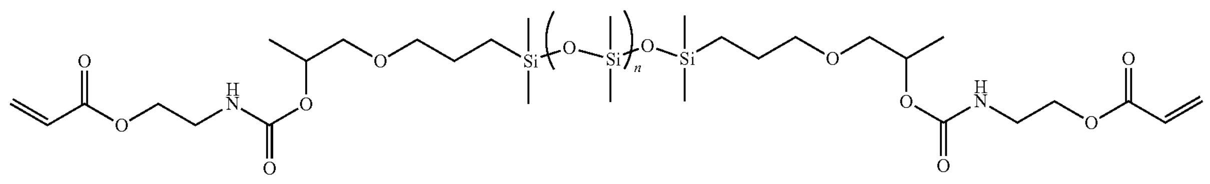

To a 1L reactor was added octamethylcyclotetrasiloxane $(D_4)$ 835.1 g, 2-hydoxypropoxy-ethyl disiloxane 15.5g and trifluoromethanesulfonic acid 418 μL. The reaction mixture was heated up to 90° C. with an agitation rate at 150 rpm, and stir at 90° C. for additional 2 hours. Sodium bicarbonate ($NaHCO_3$) 6.7g was then added to neutralize the acid. The reaction mixture was mixed at 90° C. for another 30 min before cooling down. The reaction mixture was filtered through a 2 micron filter pad and followed with vacuum stripping to obtain the di-carbinol silicone polymer. GPC analysis (PS standard): Mw 41630, Mn 19658, Mp 38960, PDI 2.12.

To a 500 ml reactor was added the carbinol silicone polymer (Mw 41630) 219.8g. The reactor was then placed into a 55° C. bath, and vacuumed at 3 mbar for 2 hours with stir. After the vacuum, the reactor was refilled with dry $N_2$ gas. Reaxis 216 0.0173g was added at this temperature, and stirred for 10 min before acryloxyethylisocyanate (AOI) 3.35g was added. The mixture was stirred for additional 2 hours. VTMO 4.44g was then added and mixed for 10 min before cooling down to obtain the silicone diacrylate polymer.

Example 4: Synthesis of Radiation Curable, (Meth)Acrylate Terminated Polysiloxane Polymer 4

4

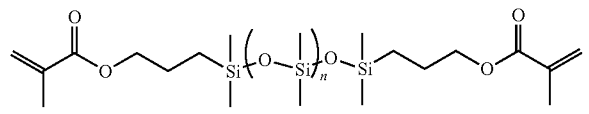

To a 500 mL reactor was added octamethylcyclotetrasiloxane $(D_4)$ 500g, Gelest 1402.0 7.9g, MEHQ 0.5g and trifluoromethanesulfonic acid 250 μL. The reaction mixture was heated up to 90° C. with an agitation rate at 150 rpm, and stir at 90° C. for additional 4 hours. Sodium bicarbonate ($NaHCO_3$) 4g was then added to neutralize the acid. The reaction mixture was mixed at 90° C. for another 30 min before cooling down. The reaction mixture was filtered through a 2 micron filter pad and followed with vacuum stripping to obtain the di-methacrylate silicone polymer. GPC analysis (PS standard): Mw 41647, Mn 20785, Mp 38706, PDI 2.0.

Example 7: Synthesis of Radiation Curable, (Meth)Acrylate Terminated Polysiloxane Polymer 7

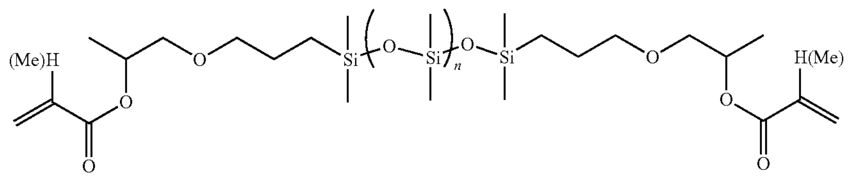

7

To a 5000 mL reactor was added octamethylcyclotetrasiloxane ($D_4$) 2500g, 2-hydoxypropoxy-ethyl disiloxane 31.2g and trifluoromethanesulfonic acid 1250 μL. The reaction mixture was heated up to 90° C. with an agitation rate at 150 rpm, and stir at 90° C. for additional 2 hours. Sodium bicarbonate ($NaHCO_3$) 40g was then added to neutralize the acid. The reaction mixture was mixed at 90° C. for another 30 min before cooling down. The reaction mixture was filtered through a 2 micron filter pad and followed with vacuum stripping to obtain the di-carbinol silicone polymer. GPC analysis (PS standard): Mw 58820, Mn 24232, Mp 54116, PDI 2.4.

To a 1000 ml reactor was added the carbinol silicone polymer ($X_{44633}$) 492.1g, triethylamine 5.6g, MEHQ 3.4g and toluene 1149g. The reactor was then placed into an ice/H2O bath with stir. Acryloyl chloride 4.98g was added to above reaction mixture dropwise through an addition funnel at <4 degree C. After the addition was completed, the reaction mixture was slowly warmed up to room temperature and mixed for additional 16 hours. The resulting mixture was then passed through a pad of silica gel. Vacuum removal of the volatiles will then obtain the silicone diacrylate polymer.

Example 9: Second Synthesis of Radiation Curable, (Meth)Acrylate Terminated Polysiloxane Polymer 4

4

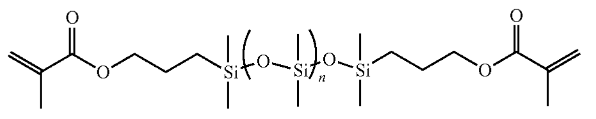

To a 1500 mL reactor was added octamethylcyclotetrasiloxane ($D_4$) 4500g, Gelest 1402.0 54.6g, MEHQ 2.0g and trifluoromethanesulfonic acid 2250 μL. The reaction mixture was heated up to 90° C. with an agitation rate at 150 rpm, and stir at 90° C. for additional 4 hours. Sodium bicarbonate $(NaHCO_3)_{36}$g was then added to neutralize the acid. The reaction mixture was mixed at 90° C. for another 30 min before cooling down. The reaction mixture was filtered through a 2 micron filter pad and followed with vacuum stripping to obtain the di-methacrylate silicone polymer. GPC analysis (PS standard): Mw 54594, Mn 26647, Mp 50644, PDI 2.1.

Sample Cure

Samples were cast as 2 mm films and cured in a Dymax 5076 UV chamber having the following output.

| | UVA | UVB | UVC | UVV |
|---|---|---|---|---|
| wavelength (nm) | 320-390 | 280-320 | 250-260 | 395-445 |
| dosage (J/cm$^2$) | 2.37 | 0 | 0 | 2.59 |
| intensity (W/cm$^2$) | 0.025 | 0 | 0 | 0.027 |

Samples were exposed for 99 seconds on one side, flipped over and exposed for 99 seconds on the opposing side.

Measurement of Shore a Hardness

The procedure is carried out in accordance with ASTM D2240.

Measurement of Mechanical Properties (Tensile Test)

Mechanical properties are determined on a tensile test machine in accordance with ASTM D638.

Measurement of Viscosity

Viscosity was tested using a Brookfield viscometer, spindle #3, with a with a torque percent in the range of 45%-95% at 25° C.

Measurement of Compression Set

Compression set was tested according to ASTM D395B. Briefly, samples were either a 6 mm cylindrical plug or a stack of 3, 2 mm films. Initial height of the samples was taken. Spacer height was an average of 4.5 mm. Samples were conditioned in a steel fixture for 22 hours at 150° C. and 25% compression. After conditioning the samples were cooled to room temperature and height taken. Compression set is the average of 3 test samples each calculated using the formula:

((Initial Height(in)−Final Height(in))/((Initial Height (in)−Spacer Height(in)))*100.

In the results a numerically lower compression set percentage indicates a material that has less compression set and returns more closely to its pretest dimensions. In some embodiments the elastomers have a desirably low compression set of <40%, preferably <30% and more preferably <20%.

Film Appearance and Feel

Films were visually examined and characterized on a scale of T (translucent) to W (white). Any visually noticeable coloration was noted. Surface condition was tested by touching with a finger.

Example 10

Curable compositions were prepared according to the following table. All amounts are in wt. % and are rounded to one decimal place.

| component | composition A | B | C | 1 |
|---|---|---|---|---|
| (meth)acrylate-functionalized polysiloxane polymer[1] | 57.8 | 60.9 | 60.9 | 58.3 |
| poly(meth)acrylate terminated PDMS oligomer[2] | 17.4 | 13.0 | 13.0 | 12.5 |
| poly(meth)acrylate terminated PDMS oligomer[3] | 8.7 | 6.5 | 6.5 | 6.2 |
| poly(meth)acrylate terminated PDMS oligomer[4] | 8.7 | 6.5 | 6.5 | 6.2 |
| mono-functional (meth)acrylate oligomer[5] | 5.8 | 4.4 | 4.4 | 8.3 |
| TriSilanollsooctyl POSS[6] | 0 | 3.5 | 1.7 | 0 |
| Acrylo POSS Cage Mixture[7] | 0 | 3.5 | 1.7 | 0 |
| surface treated hydrophobic fumed silica[8] | 0 | 0 | 3.5 | 6.7 |
| reaction initiator | 1.6 | 1.7 | 1.7 | 1.7 |
| total | 100 | 100 | 100 | 100 |

[1]A polymer having a methacrylate termination adjacent each chain and made according to the method of Example 4 and having a molecular weight about 30,000.
[2]X-22-2445
[3]X164A
[4]X164B
[5]X174BX
[6]SO1455 available from Hybrid Plastics Inc.
[7]MA0736 available from Hybrid Plastics Inc.
[8]AEROSIL 812S Viscosity of uncured Sample 1 was 2785 cps at room temperature.

Curable compositions were tested after curing but with no aging. Results are shown in the following table.

| property | composition A | B | C | 1 |
|---|---|---|---|---|
| modulus (psi) | 105 | 95 | 120 | 99 |
| modulus ($N/mm^2$) | 0.72 | 0.65 | 0.83 | 0.68 |
| tensile strength @ yield (psi) | 22 | 35 | 56 | 67 |
| tensile strength @ yield ($N/mm^2$) | 0.15 | 0.24 | 0.39 | 0.46 |
| elongation (%) | 24 | 42 | 56 | 74 |
| hardness (Shore A) | NA | 25 | 31 | 29 |
| sticky | no | no | no | no |
| film color | clear | clear | clear | clear |

The cured samples were aged at 150° C. for 22 hours (compression set testing only) or 200° C. for 100 hours (all other tests) and tested after aging. Results are shown in the following table.

| property | composition A | B | C | 1 |
|---|---|---|---|---|
| compression set (%) | 23 | 21 | 27 | 42 |
| modulus (psi) | 268 | 314 | 292 | 345 |
| modulus ($N/mm^2$) | 1.8 | 2.2 | 2.0 | 2.4 |
| tensile strength @ yield (psi) | 30 | 39 | 64 | 85 |
| tensile strength @ yield ($N/mm^2$) | .21 | .27 | .44 | .59 |

-continued

| property | composition A | B | C | 1 |
|---|---|---|---|---|
| elongation (%) | 11 | 12 | 21 | 24 |
| hardness (Shore A) | NA | 52 | 51 | 55 |
| film color | clear | dark yellow | light yellow | clear/hazy |

Comparative Sample A had an unacceptably low tensile strength before and after aging. Samples B and C both had a yellow color after aging. Yellowing of samples after aging is considered unacceptable in many applications. Sample 1 had the highest and most desirable tensile strength and elongation before and after aging. Sample 1 also had an acceptable color after aging.

Example 11

Curable compositions were prepared according to the following table. All amounts are in wt. % and are rounded to one decimal place.

| component | composition 2 | 3 | 4 | 5 |
|---|---|---|---|---|
| (meth)acrylate-functionalized polysiloxane polymer[1] | 58.3 | 58.3 | 53.8 | 53.8 |
| poly(meth)acrylate terminated PDMS oligomer[2] | 12.5 | 12.5 | 11.5 | 11.5 |
| poly(meth)acrylate terminated PDMS oligomer[3] | 0 | 6.2 | 0 | 5.8 |
| poly(meth)acrylate terminated PDMS oligomer[4] | 0 | 6.2 | 0 | 5.8 |
| mono-functional (meth)acrylate oligomer[5] | 17.5 | 5 | 23.8 | 12.3 |
| TriSilanollsooctyl POSS[6] | 0 | 0 | 0 | 0 |
| Acrylo POSS Cage Mixture[7] | 0 | 0 | 0 | 0 |
| surface treated hydrophobic fumed silica[8] | 6.7 | 6.7 | 6.2 | 6.2 |
| reaction initiator[9] | 5 | 5 | 4.6 | 4.6 |
| total | 100 | 100 | 100 | 100 |
| viscosity (cps) | 7400 | 8025 | 2625 | 2850 |

[1]A polymer havung a methylacrylate termination adjacent each chain end and made according to the method of Example 4 and molecular weight of about 30,000.
[2]X-22-2445
[3]X164A
[4]X164B
[5]X174BX
[6]SO1455 available from Hybrid Plastics Inc.
[7]MA0736 available from Hybrid Plastics Inc.
[8]AEROSIL 812S
[9]2,2-Diethoxyacetophenone, 95%

Curable compositions were tested after curing but with no aging. Results are shown in the following table.

| property | composition 4 | 5 |
|---|---|---|
| modulus (psi) | 17 | 66 |
| modulus ($N/mm^2$) | 0.12 | 0.46 |
| tensile strength @ yield (psi) | 32 | 55 |
| tensile strength @ yield ($N/mm^2$) | 0.22 | 0.38 |
| elongation (%) | 201 | 93 |
| hardness (Shore A) | 5 | 19 |
| sticky | yes | no |
| film color | clear | clear |

Sample 4 had an undesirable tacky surface feel after curing.

The cured samples were aged at 150° C. for 22 hours (compression set testing only) or 200° C. for 100 hours (all other tests) and tested after aging. Results are shown in the following table.

| | composition | |
|---|---|---|
| property | 4 | 5 |
| compression set (%) | 70 | 55 |
| modulus (psi) | 276 | 320 |
| modulus ($N/mm^2$) | 1.90 | 2.21 |
| tensile strength @ yield (psi) | 61 | 63 |
| tensile strength @ yield ($N/mm^2$) | 0.42 | 0.43 |
| elongation (%) | 23 | 20 |
| hardness (Shore A) | 46 | 50 |
| film color | clear | clear |
| weight loss after aging (%) | 10.7 | 11.6 |

Example 12

Curable compositions were prepared according to the following table. All amounts are in wt. % and are rounded to one decimal place.

| | composition | | |
|---|---|---|---|
| component | 6 | 7 | 8 |
| acrylate-functionalized polysiloxane polymer[1] | 58.3 | 0 | 0 |
| acrylate-functionalized polysiloxane polymer[2] | 0 | 58.3 | 0 |
| di-acrylate modified PDMS[3] | 0 | 0 | 58.3 |
| poly(meth)acrylate terminated PDMS oligomer[4] | 12.5 | 12.5 | 12.5 |
| poly(meth)acrylate terminated PDMS oligomer[5] | 12.5 | 12.5 | 12.5 |
| mono-functional (meth)acrylate oligomer[6] | 8.3 | 8.3 | 8.3 |
| surface treated hydrophobic fumed silica[7] | 6.7 | 6.7 | 6.7 |
| reaction initiator[8] | 1.7 | 1.7 | 1.7 |
| total | 100 | 100 | 100 |
| viscosity (cps) | 5712 | 5062 | 3330 |

[1]A polymer having an acrylate termination adjacent each chain end and made according to the method of Example 7 and having a molecular weight of about 62,000.
[2]A polymer made according to the method of Example 1 and having a molecular weight of about 56,000.
[3]X-26-5066 having a molecular weight of 28,000 available from Shin-Etsu
[4]X-22-2445
[5]X164B
[6]X174BX
[7]AEROSIL 812S
[8]2,2-Diethoxyacetophenone, 95%

Curable compositions were tested after curing but with no aging. Results are shown in the following table.

| | composition | | |
|---|---|---|---|
| property | 6 | 7 | 8 |
| modulus (psi) | 50 | 105 | 140 |
| modulus ($N/mm^2$) | 0.34 | 0.72 | 0.97 |
| tensile strength @ yield (psi) | 69 | 134 | 54 |
| tensile strength @ yield ($N/mm^2$) | 0.48 | 0.92 | 0.37 |
| elongation (%) | 152 | 125 | 39 |
| hardness (Shore A) | 13 | 33 | 36 |
| sticky | no | no | no |
| film color | clear | clear | clear |

The cured samples were aged at 150° C. for 22 hours (compression set testing only) or 200° C. for 100 hours (all other tests) and tested after aging. Results are shown in the following table.

| | composition | | |
|---|---|---|---|
| property | 6 | 7 | 8 |
| compression set (%) | 39 | 22 | 23 |
| modulus (psi) | 175 | 114 | 262 |
| modulus ($N/mm^2$) | 1.21 | 0.79 | 1.81 |
| tensile strength @ yield (psi) | 84 | 111 | 122 |
| tensile strength @ yield ($N/mm^2$) | 0.58 | 0.77 | 0.84 |
| elongation (%) | 49 | 99 | 47 |
| hardness (Shore A) | 39 | 33 | 50 |
| film color | clear to yellow | clear to orange | clear |
| weight loss after aging (%) | 5.84 | 5.32 | 5.15 |

The color in Samples 6 and 7 would be undesirable in applications requiring optical clarity. It is not known whether the color in Sample 6 could be removed by further work up and filtration of that Sample.

Example 13

Curable compositions were prepared according to the following table. All amounts are in wt. % and are rounded to one decimal place.

| | composition | | |
|---|---|---|---|
| component | 9 | 10 | 11 |
| (meth)acrylate-functionalized polysiloxane polymer[1] | 58.8 | 0 | 0 |
| (meth)acrylate-functionalized polysiloxane polymer[2] | 0 | 58.8 | 0 |
| (meth)acrylate-functionalized polysiloxane polymer[3] | 0 | 0 | 58.8 |
| di-acrylate modified PDMS[4] | 13.1 | 13.1 | 13.1 |
| X-2426[5] | 10.9 | 10.9 | 10.9 |
| poly(meth)acrylate terminated PDMS oligomer[6] | 8.7 | 8.7 | 8.7 |
| surface treated hydrophobic fumed silica[7] | 6.5 | 6.5 | 6.5 |
| reaction initiator[8] | 2.0 | 2.0 | 2.0 |
| total | 100 | 100 | 100 |
| viscosity (cps) | 2830 | 6537 | 8450 |

[1]A polymer made according to the method of Example 4 and having a molecular weight of about 30,000.
[2]A polymer having methacrylate terminations adjacent each chain end and made according to the method of Example 4 and having a molecular weight of about 41,000.
[3]A polymer having methacrylate terminations adjacent each chain end and made according to the method of Example 4 and having a molecular weight of about 52,000.
[4]X-26-5066 having a molecular weight of 28,000 available from Shin-Etsu
[5]X-22-2426
[6]X164B
[7]AEROSIL 812S
[8]2,2-Diethoxyacetophenone, 95%

Curable compositions were tested after curing but with no aging. Results are shown in the following table.

| | composition | | |
|---|---|---|---|
| property | 9 | 10 | 11 |
| modulus (psi) | 42 | 31 | 26 |
| modulus ($N/mm^2$) | 0.29 | 0.21 | 0.18 |
| tensile strength @ yield (psi) | 49 | 71 | 61 |
| tensile strength @ yield ($N/mm^2$) | 0.34 | 0.49 | 0.42 |
| elongation (%) | 130 | 296 | 292 |
| hardness (Shore A) | 18 | 7 | 8 |
| sticky | no | no | no |
| film color | clear | clear | clear |

The cured samples were aged at 150° C. for 22 hours (compression set testing only) or 200° C. for 100 hours (all other tests) and tested after aging. Results are shown in the following table.

| | composition | | |
|---|---|---|---|
| property | 9 | 10 | 11 |
| compression set (%) | 31 | 38 | 41 |
| modulus (psi) | 121 | 100 | 93 |
| modulus (N/mm$^2$) | 0.83 | 0.69 | 0.64 |
| tensile strength @ yield (psi) | 82 | 82 | 93 |
| tensile strength @ yield (N/mm$^2$) | 0.57 | 0.57 | 0.64 |
| elongation (%) | 75 | 101 | 127 |
| hardness (Shore A) | 33 | 30 | 27 |
| film color | clear | clear | clear |
| weight loss after aging (%) | 5.0 | 4.6 | 4.7 |

Example 14

Curable compositions were prepared according to the following table. All amounts are in wt. % and are rounded to one decimal place.

| | composition | | | |
|---|---|---|---|---|
| component | 12 | 13 | 14 | 15 |
| (meth)acrylate-functionalized polysiloxane polymer[1] | 21 | 0 | 0 | 0 |
| (meth)acrylate-functionalized polysiloxane polymer[2] | 0 | 21 | 0 | 0 |
| (meth)acrylate-functionalized polysiloxane polymer[3] | 0 | 0 | 21 | 0 |
| di-acrylate terminated PDMS)[4] | 0 | 0 | 0 | 21 |
| di-acrylate terminated PDMS oligomer[5] | 13.1 | 13.1 | 13.1 | 13.1 |
| mono-functional (meth)acrylate oligomer[6] | 10.9 | 10.9 | 10.9 | 10.9 |
| poly(meth)acrylate terminated PDMS oligomer[6] | 8.7 | 8.7 | 8.7 | 8.7 |
| surface treated hydrophobic fumed silica[7] | 6.5 | 6.5 | 6.5 | 6.5 |
| reaction initiator[8] | 2.0 | 2.0 | 2.0 | 2.0 |
| total | 100 | 100 | 100 | 100 |

[1]A polymer having methacrylate terminations adjacent each chain end and made according to the method of example 4 and having a molecular weight of about 30,000.
[2]A polymer having methacrylate terminations adjacent each chain end and made according to the method of Example 4 and having a molecular weight of about 41,000.
[3]A polymer having methacrylate terminations adjacent each chain end and made according to the method of claim 4 and having a molecular weight of about 52,000.
[4]X-26-5066 having a molecular weight of 28,000 available from Shin-Etsu
[5]X-22-2445 having a molecular weight of 1,600 available from Shin-Etsu
[6]X-22-2426 available from Shin-Etsu
[7]AEROSIL 812S
[8]2,2-Diethoxyacetophenone, 95%

Curable compositions were tested after curing but with no aging. Results are shown in the following table.

| | composition | | | |
|---|---|---|---|---|
| property | 12 | 13 | 14 | 15 |
| modulus (psi) | 125 | 94 | 82 | 148 |
| modulus (N/mm$^2$) | 0.86 | 0.65 | 0.57 | 1.02 |
| tensile strength @ yield (psi) | 78 | 94 | 117 | 84 |
| tensile strength @ yield (N/mm$^2$) | 0.54 | 0.65 | 0.81 | 0.58 |
| elongation (%) | 70 | 118 | 171 | 67 |
| hardness (Shore A) | 34 | 31 | 26 | 37 |
| sticky | no | no | no | no |
| film color | clear | clear | clear | clear |

The cured samples were aged at 150° C. for 22 hours (compression set testing only) or 200° C. for 100 hours (all other tests) and tested after aging. Results are shown in the following table.

| | composition | | | |
|---|---|---|---|---|
| property | 12 | 13 | 14 | 15 |
| compression set (%) | 24 | 27 | 34 | 25 |
| modulus (psi) | 182 | 156 | 153 | 210 |
| modulus (N/mm$^2$) | 1.25 | 1.08 | 1.05 | 1.45 |
| tensile strength @ yield (psi) | 81 | 118 | 137 | 107 |
| tensile strength @ yield (N/mm$^2$) | 0.56 | 0.81 | 0.94 | 0.74 |
| elongation (%) | 43 | 84 | 108 | 49 |
| hardness (Shore A) | 43 | 39 | 39 | 47 |
| film color | clear | clear | clear | clear |
| weight loss after aging (%) | 5.2 | 5.0 | 5.0 | 4.7 |

In view of the foregoing description and examples, it will be apparent to those skilled in the art that equivalent modifications thereof can be made without departing from the scope of the claims.

The invention claimed is:

1. A curable composition comprising:

a) a (meth)acrylate functionalized polysiloxane polymer having the structure below

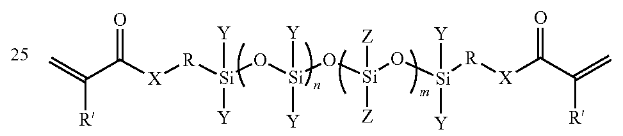

wherein:

each X is O;

each R is a bivalent moiety independently selected from alkylene, heteroalkylene, arylene, heteroarylene, aralkylene, amine; urethane; urea; ether, ester and combinations thereof;

each Y is independently selected from alkyl and aryl;

each Z is independently selected from alkyl and aryl;

n is an integer from about 1 to about 2300;

m is an integer from 0 to about 2300, wherein if m is greater than 1, then the n blocks and the m blocks can be arranged in any order; and each R' is independently H or methyl;

wherein if each Y is alkyl, each R is alkylene, and each X is bonded to a primary carbon atom, then n+m is 1200 or greater;

b) a crosslinker;

c) fumed silica;

d) a reaction initiator;

e) optionally, a functionalized silsesquioxane component;

f) optionally, an acrylate monomer;

g) optionally one or more additives; and wherein the composition is free of materials having Si—H and S—H comprising moieties, and wherein the composition comprises the (meth)acrylate functionalized polysiloxane polymer in an amount greater than or equal to 40 weight percent (wt. %) and less than or equal to 70 wt. % based on a total weight of the composition.

2. The composition of claim 1, wherein:

a) each R is a bivalent moiety independently selected from alkylene, heteroalkylene, amine; urethane; urea; ether and combinations thereof; or b) at least one Z is aryl; or c) any combination of a) and b).

3. The composition of claim 1, wherein R comprises a urethane group, an ether group, an amine group and combinations thereof.

4. The composition of claim 1, wherein m is 0.

5. The composition of claim 1, wherein m is an integer from 1 to about 2300 and each Si atom in the m block has one phenyl Z moiety and one $C_1$-3 alkyl Z moiety.

6. The composition of claim 1, wherein R comprises one or more heteroatoms.

7. The composition of claim 1, wherein R has a length of 2 to 20 atoms.

8. The composition of claim 1, further comprising:

h) a poly(meth)acrylate terminated PDMS oligomer having the structure

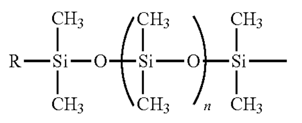

wherein n is an integer in the range of 1 to about 400, each (meth)acrylate functional group is bonded to a different terminal Si atom, and each (meth)acrylate functional group is independently chosen from the structure:

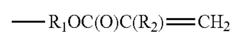

wherein R1 is an alkyl group, an alkenyl group or a heterocyclo group, and $R_2$ is H or alkyl; or i) a mono(meth)acrylate terminated PDMS oligomer having the structure:

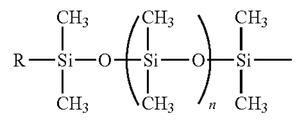

wherein R is a hydrocarbyl moiety or a heterocarbyl moiety, n is an integer in the range of 1 to about 160, the (meth)acrylate functional group is bonded to the terminal Si atom, and the (meth)acrylate functional group has the structure:

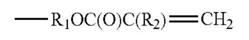

wherein R1 is an alkyl group, an alkenyl group or a heterocyclo group, and $R_2$ is H or alkyl; or j) both h) and i).

9. Cured reaction products of the curable composition of claim 1.

10. The composition of claim 8, wherein the composition comprises the poly(meth)acrylate terminated PDMS oligomer in an amount greater than or equal to 10 wt. % and less than or equal to 30 wt. % based on the total weight of the composition.

11. The composition of claim 8, wherein the composition comprises the mono(meth)acrylate terminated PDMS oligomer in an amount greater than or equal to 10 wt. % and less than or equal to 30 wt. % based on the total weight of the composition.

* * * * *